US007932942B2

(12) United States Patent
Inoue et al.

(10) Patent No.: US 7,932,942 B2
(45) Date of Patent: *Apr. 26, 2011

(54) SOLID-STATE IMAGING DEVICE INCLUDING THREE STACKED PHOTOELECTRIC CONVERSION LAYERS, THREE ACCUMULATORS, AND A SINGLE READOUT CIRCUIT

(75) Inventors: Tomoki Inoue, Saitama (JP); Atsuhiko Ishihara, Saitama (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 641 days.

This patent is subject to a terminal disclaimer.

(21) Appl. No.: 11/353,236

(22) Filed: Feb. 14, 2006

(65) Prior Publication Data

US 2008/0055437 A1 Mar. 6, 2008

(30) Foreign Application Priority Data

Feb. 15, 2005 (JP) ................ P.2005-037622

(51) Int. Cl.
*H04N 3/14* (2006.01)
*H01L 27/146* (2006.01)

(52) U.S. Cl. ................. 348/272; 257/444
(58) Field of Classification Search .......... 348/272; 250/226, 208.1; 257/431–466, 272
See application file for complete search history.

(56) References Cited

U.S. PATENT DOCUMENTS

| 5,965,875 | A * | 10/1999 | Merrill ................... 250/226 |
| 6,373,117 | B1 * | 4/2002 | Theil ...................... 257/444 |
| 6,476,374 | B1 * | 11/2002 | Kozlowski et al. ...... 250/214.1 |
| 6,521,881 | B2 * | 2/2003 | Tu et al. .................. 250/208.1 |
| 6,828,545 | B1 * | 12/2004 | Hamilton et al. ........ 250/214.1 |
| 6,891,242 | B2 * | 5/2005 | Gidon et al. ............. 257/443 |
| 7,164,113 | B2 * | 1/2007 | Inokuma et al. ......... 250/208.1 |
| 7,217,983 | B2 * | 5/2007 | Suzuki ..................... 257/444 |

(Continued)

FOREIGN PATENT DOCUMENTS

JP 61-265534 11/1986

(Continued)

OTHER PUBLICATIONS

Japanese Office Action dated Mar. 16, 2010 with an English translation.

*Primary Examiner* — Sinh Tran
*Assistant Examiner* — Mark Monk
(74) *Attorney, Agent, or Firm* — McGinn IP Law Group, PLLC

(57) ABSTRACT

A solid-state imaging device is provided and has: three photoelectric conversion layers stacked above a semiconductor substrate 1, each detecting a different color; three signal charge accumulators in a semiconductor substrate for accumulating signal charges generated in each of the three photoelectric conversion layers: and a signal readout circuit in the semiconductor substrate for reading out signals corresponding to the signal charges accumulated in the signal charge accumulators. The three signal charge accumulators are arranged in a direction in the surface of the semiconductor substrate as a pixel and a plurality of the pixels are arranged in a square lattice pattern both in the direction and a direction perpendicular thereto. The three signal charge accumulators arranged in each pixel in an odd row are arranged such that an array of the signal charge accumulators in the first sub-row of each pixel has all of the three signal charge accumulators.

21 Claims, 13 Drawing Sheets

U.S. PATENT DOCUMENTS

| | | | |
|---|---|---|---|
| 7,436,038 B2 * | 10/2008 | Engelmann et al. | 257/444 |
| 7,515,187 B2 * | 4/2009 | Suzuki | 348/296 |
| 7,550,813 B2 * | 6/2009 | Suzuki | 257/440 |
| 2001/0033333 A1 * | 10/2001 | Suzuki et al. | 348/220 |
| 2003/0189159 A1 * | 10/2003 | Inoue | 250/208.1 |
| 2004/0056180 A1 * | 3/2004 | Yu | 250/214.1 |
| 2004/0232314 A1 * | 11/2004 | Hong | 250/208.1 |
| 2005/0109917 A1 * | 5/2005 | Wong | 250/208.1 |
| 2005/0190290 A1 * | 9/2005 | Sun et al. | 348/374 |
| 2005/0230775 A1 * | 10/2005 | Watanabe et al. | 257/444 |
| 2005/0247859 A1 * | 11/2005 | Hsu et al. | 250/208.1 |
| 2005/0279916 A1 * | 12/2005 | Kang et al. | 250/208.1 |
| 2007/0125934 A1 * | 6/2007 | Matthews | 250/208.1 |

FOREIGN PATENT DOCUMENTS

JP  2002-83946  3/2002

* cited by examiner

SOLID-STATE IMAGING DEVICE INCLUDING THREE STACKED PHOTOELECTRIC CONVERSION LAYERS, THREE ACCUMULATORS, AND A SINGLE READOUT CIRCUIT

FIELD OF THE INVENTION

The present application claims foreign priority based on Japanese Patent Application No. JP2005-37622, filed Feb. 15 of 2005, the contents of which is incorporated herein by reference.

The present invention relates to an solid-state imaging device having three photoelectric conversion layers stacked above a semiconductor substrate, each detecting a different color, a plurality of signal charge accumulators formed in the semiconductor substrate for accumulating signal charges generated in a corresponding layer of the three photoelectric conversion layers, and a signal readout circuit formed in the semiconductor substrate for reading out signals corresponding to the signal charges accumulated in the signal charge accumulators.

BACKGROUND OF THE INVENTION

Significant advances have been made in recent years in developing CCD or CMOS type solid-state imaging devices in which a large number of photodiodes (PDs) are integrated on the surface of a semiconductor substrate, with a color filter of red (R), green (G), or blue (B) stacked on each PD. Current digital cameras are equipped with such solid-state imaging devices having several millions of PDs integrated on a single chip.

The above-mentioned solid-state imaging device, configured to use the color filters, suffers from low optical efficiency, false color generation, and the like. Therefore, as a solid-state imaging device without these disadvantages, there has been proposed a stacked solid-state imaging device, for example, described in JP-A-2002-83946. This stacked solid-state imaging device is configured such that three photoelectric conversion layers are stacked above a semiconductor substrate for detecting red (R), green (G), and blue (B) color lights, and signal charges generated in the films are accumulated in accumulation diodes formed on the semiconductor substrate, then the signal charges accumulated in the accumulation diodes are read out and transferred by a signal readout circuit such as vertical and horizontal CCDs formed on the surface of the semiconductor substrate. This stacked solid-state imaging device can eliminate the above disadvantages and produce high quality images.

In the stacked solid-state imaging device described in JP-A-2002-83946, it is required to read out the R signal in the first frame, the G signal in the second frame, and the B signal in the third frame, and to use the R, G, and B signal readouts at the end of the third frame to produce one color image data. This time-intensive process for producing color image data makes it difficult to achieve video acquisition, high-speed continuous shooting, and the like.

SUMMARY OF THE INVENTION

An object of an illustrative, non-limiting embodiment of the invention is to provide a stacked solid-state imaging device capable of high-speed video acquisition or continuous shooting.

An solid-state imaging device according to an illustrative, non-limiting embodiment of the invention includes: three photoelectric conversion layers stacked above a semiconductor substrate, each detecting a different color from the others of the three photoelectric conversion layers; three signal charge accumulators formed in the semiconductor substrate for accumulating signal charges generated in a corresponding layer of the three photoelectric conversion layers; and a signal readout circuit formed in the semiconductor substrate for reading out signals corresponding to the signal charges accumulated in the signal charge accumulators. The three signal charge accumulators are arranged in the column direction in a surface of the semiconductor substrate as a pixel, and a plurality (a large number) of the pixels are arranged in a square lattice pattern both in the above-mentioned column direction and the row direction perpendicular thereto in the surface of the semiconductor substrate. With regard to the following three arrays: an array (a first array) of signal charge accumulators in a first sub-row of each pixel in a pixel row (a first pixel row in the square lattice pattern of the pixels); an array (a second array) of signal charge accumulators in a second sub-row of each pixel in the pixel row; and an array (a third array) of signal charge accumulators in a third sub-row of each pixel in the pixel row, the signal charge accumulators are arranged such that at least one of the three arrays includes all of the three signal charge accumulators.

With this configuration, one color image data can be produced without reading out signals corresponding to signal charges accumulated in all of the signal charge accumulators in each of the pixels in a pixel row. Thus, color image data can be quickly produced, allowing high-speed video acquisition.

In a solid-state imaging device according to an illustrative, non-limiting embodiment of the invention, the signal charge accumulators are arranged such that each of the three arrays has all of the three signal charge accumulators.

With this configuration, color image data can be produced for each of the three arrays. Thus, color images can be acquired at short time intervals by controlling exposure timing for the photoelectric conversion layer corresponding to each of the arrays, allowing high-speed video acquisition or high-speed continuous shooting.

In a solid-state imaging device according to an illustrative, non-limiting embodiment of the invention, the array including all of the three signal charge accumulators is any one of a Bayer layout, longitudinal stripe layout, and lateral stripe layout.

In a solid-state imaging device according to an illustrative, non-limiting embodiment of the invention, the pixel row is part of all rows of the pixels arranged in the surface of the semiconductor substrate.

This configuration enables thinning-out signal readout during video acquisition and hence higher-speed video acquisition.

In a solid-state imaging device according to an illustrative, non-limiting embodiment of the invention, the photoelectric conversion layer includes a green-light photoelectric conversion layer for detecting green light. With regard to the following three arrays: an array (a first array) of signal charge accumulators in a first sub-row of pixels (in a second pixel row) other than the pixels in the first pixel row; an array (a second array) of signal charge accumulators in a second sub-row of pixels other than the pixels in the first pixel row; and an array (a third array) of signal charge accumulators in a third sub-row of pixels other than the pixels in the first pixel row, the signal charge accumulators are arranged such that at least one of the three arrays has only the signal charge accumulators for accumulating signal charges generated in the green-light photoelectric conversion layer.

With this configuration, signals obtained from the arrays only having signal charge accumulators for accumulating signal charges generated in the green-light photoelectric conversion layer can be used for autofocusing (AF), allowing fast AF operation in a drive mode in which signals are read out only from those arrays during the AF processing.

According to the invention, there can be provided a stacked solid-state imaging device capable of high-speed video acquisition or continuous shooting.

DETAILED DESCRIPTION OF THE INVENTION

Exemplary embodiments of the invention will be described below with reference to the drawings.

First Embodiment

Figure 1:
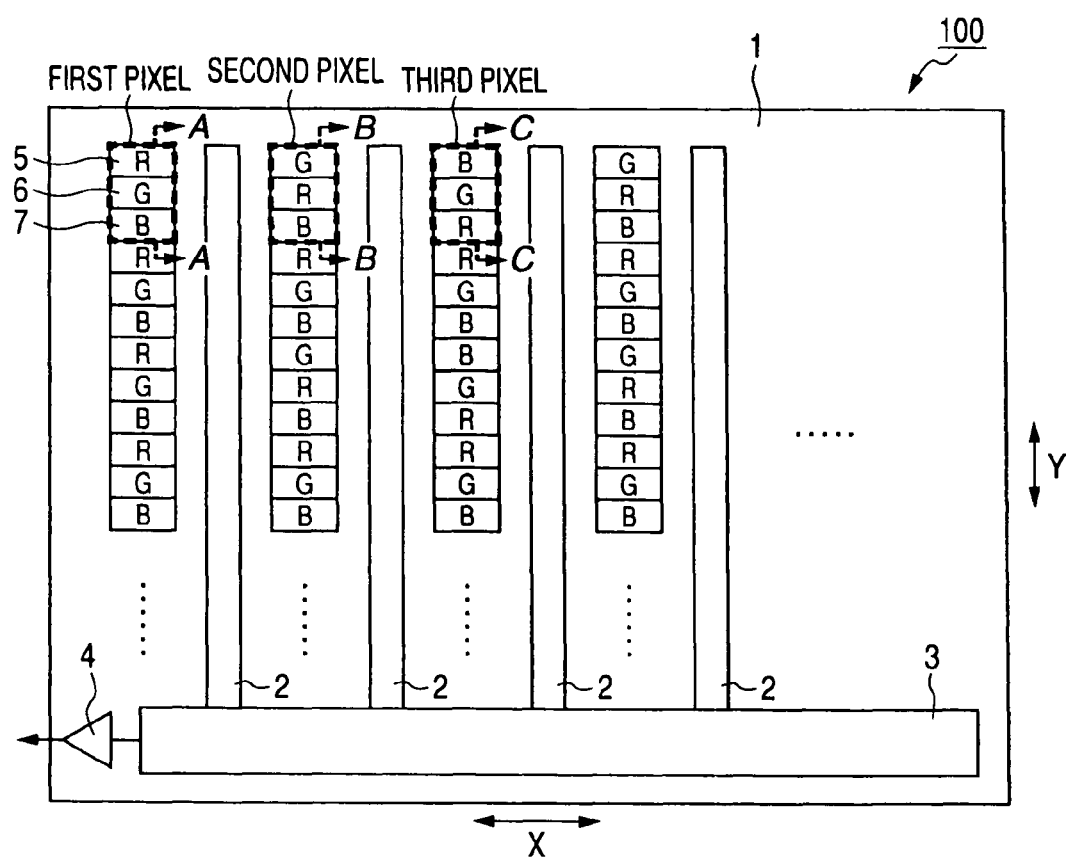
FIG. 1 is a diagrammatic plan view of a solid-state imaging device for describing a first exemplary embodiment of the invention.
Figure 2A:
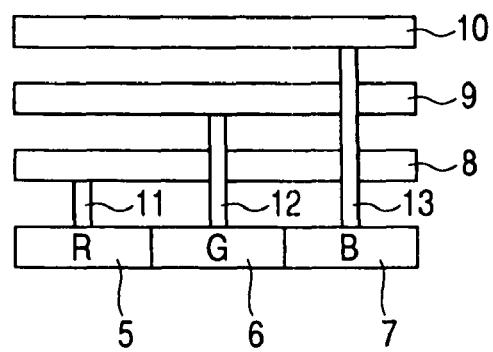
FIG. 2A is a diagrammatic sectional view of the solid-state imaging device taken along the line A-A shown in FIG. 1.
Figure 2B:
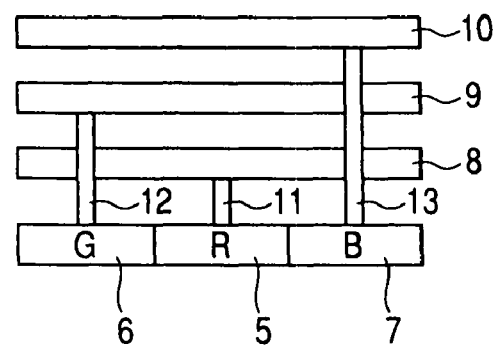
FIG. 2B is a diagrammatic sectional view of the solid-state imaging device taken along the line B-B shown in FIG. 1.
Figure 2C:
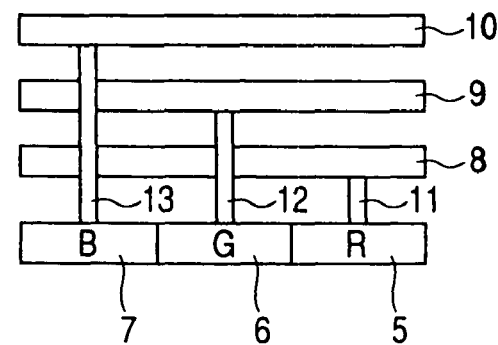
FIG. 2C is a diagrammatic sectional view of the solid-state imaging device taken along the line C-C shown in FIG. 1.

FIG. 1 is a diagrammatic plan view of a solid-state imaging device for describing a first exemplary embodiment of the invention. FIG. 2A is a diagrammatic sectional view of the solid-state imaging device taken along the line A-A shown in FIG. 1. FIG. 2B is a diagrammatic sectional view of the solid-state imaging device taken along the line B-B shown in FIG. 1. FIG. 2C is a diagrammatic sectional view of the solid-state imaging device taken along the line C-C shown in FIG. 1.

As shown in FIGS. 2A to 2C, a solid-state imaging device 100 has a red (R) light photoelectric conversion layer 8 for detecting red light and generating corresponding red-light signal charges, a green (G) light photoelectric conversion layer 9 for detecting green light and generating corresponding green-light signal charges, and a blue (B) photoelectric conversion layer 10 for detecting blue light and generating corresponding blue-light signal charges. Those films are stacked in this order above a semiconductor substrate 1. The order of stacking of the photoelectric conversion layers is not limited as mentioned above. Organic materials are preferably used for the photoelectric conversion layers.

On the surface of the semiconductor substrate 1, there are provided a signal charge accumulator 5 (designated by "R" in FIGS. 1 and 2) for accumulating R signal charges generated in the R photoelectric conversion layer 8, a signal charge accumulator 6 (designated by "G" in FIGS. 1 and 2) for accumulating G signal charges generated in the G photoelectric conversion layer 9, and a signal charge accumulator 7 (designated by "B" in FIGS. 1 and 2) for accumulating B signal charges generated in the B photoelectric conversion layer 10. These accumulators are formed in a square lattice pattern.

The R photoelectric conversion layer 8 and the signal charge accumulator 5 are electrically connected together by a wiring 11. The G photoelectric conversion layer 9 and the signal charge accumulator 6 are electrically connected together by a wiring 12. The B photoelectric conversion layer 10 and the signal charge accumulator 7 are electrically connected together by a wiring 13. The signal charges generated in each of the photoelectric conversion layers are transferred through wirings 11 to 13 respectively and accumulated in each of the signal charge accumulators.

The solid-state imaging device 100 is configured such that the three signal charge accumulators 5 to 7 are arranged columnwise (in the Y direction in FIG. 1) as one pixel, and a large number of pixels are arranged in a square lattice pattern both in the column direction and the row direction perpendicular thereto (in the X direction in FIG. 1). Each pixel provides R, G, and B signals corresponding to the signal charges generated in the photoelectric conversion layers connected to the signal charge accumulators in each pixel. Thus, the signal provided from one pixel can produce one pixel data. The number of the pixels corresponds to the size of image data acquired with the solid-state imaging device 100.

Among the large number of pixels, there are included the first pixel having the signal charge accumulator 5, the signal charge accumulator 6, and the signal charge accumulator 7 arranged columnwise in this order, the second pixel having the signal charge accumulator 6, the signal charge accumulator 5, and the signal charge accumulator 7 arranged columnwise in this order, and the third pixel having the signal charge accumulator 7, the signal charge accumulator 6, and the signal charge accumulator 5 arranged columnwise in this order.

Odd rows have the first pixel, the second pixel, the third pixel, and the second pixel arranged repeatedly in this order in the row direction, while even rows only have the first pixels arranged in the row direction.

Hereinafter, the array of the signal charge accumulators in the first sub-row of each pixel is defined as the first array, the array of the signal charge accumulators in the second sub-row of each pixel is defined as the second array, and the array of the signal charge accumulators in the third sub-row of each pixel is defined as the third array. Similarly, the array of the signal charge accumulators in the first sub-row of each pixel in odd rows is defined as the fourth array, the array of the signal charge accumulators in the second sub-row of each pixel in odd rows is defined as the fifth array, the array of the signal charge accumulators in the third sub-row of each pixel in odd rows is defined as the sixth array, the array of the signal charge accumulators in the first sub-row of each pixel in even rows is defined as the seventh array, the array of the signal charge accumulators in the second sub-row of each pixel in even rows is defined as the eighth array, and the array of the signal charge accumulators in the third sub-row of each pixel in even rows is defined as the ninth array.

In the surface of the semiconductor substrate 1, there are provided vertical transfer portions 2 for reading out signal charges accumulated in each of the signal charge accumulators 5 to 7 and transferring the signal charges in the column direction, a horizontal transfer portion 3 for transferring the signal charges transferred from the vertical transfer portions 2 in the row direction, and an output portion 4 for outputting a signal outside corresponding to the signal charges transferred from the horizontal transfer portion 3. The vertical transfer portions 2, horizontal transfer portion 3, and output portion 4 form a signal readout circuit.

The solid-state imaging device 100 can be driven, for example, in a six-phase manner to switch between the following two modes; a thinning-out readout mode in which signals are read out only from the pixels in odd rows and a normal readout mode in which signals are readout from the pixels in both odd and even rows. In video acquisition, high-speed video acquisition can be achieved by producing reduced resolution image data in the thinning-out readout mode. In still image acquisition, high-resolution still image acquisition can be achieved by producing image data in the normal readout mode.

Figure 3:
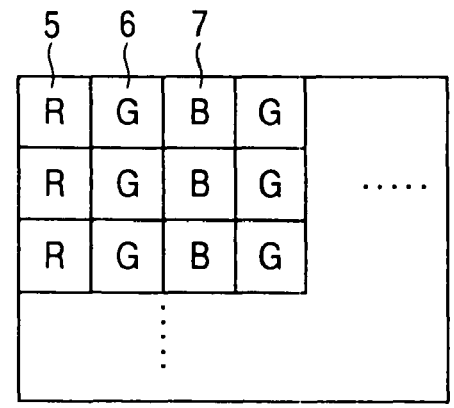
FIG. 3 shows the fourth array.

With regard to the fourth, fifth, and sixth arrays in the solid-state imaging device 100, the signal charge accumulators 5 to 7 are arranged on the surface of the semiconductor substrate 1 such that the fourth array has all of the three signal charge accumulators 5 to 7, for example, as illustrated in the longitudinal stripe layout in FIG. 3.

FIG. 3 shows the fourth array of the solid-state imaging device 100. As shown in FIG. 3, the fourth array has a so-called longitudinal stripe layout in which the following columns are arranged in the row direction; a column in which the signal charge accumulators 5 are arranged columnwise, a column in which the signal charge accumulators 6 are arranged columnwise, and a column in which the signal charge accumulators 7 are arranged columnwise. Thus, color image data can be produced only with signals read out from the fourth array. Accordingly, high-speed video acquisition can be achieved without having to read out signals from all of the fourth to sixth arrays as conventionally performed. On the other hand, in still image acquisition, high-resolution still image data can be produced by reading out R, G, and B signals from each of the first to third arrays to produce one pixel data.

With regard to the seventh, eighth, and ninth arrays in the solid-state imaging device 100, the signal charge accumulators 5 to 7 are arranged on the surface of the semiconductor substrate 1 such that the only eighth array has the signal charge accumulators 6. With this arrangement, only G signals are read out from the eighth array and an in-focus position can be determined using the G signals, allowing a digital camera equipped with an autofocus (AF) feature to quickly perform its AF process.

Figure 4:
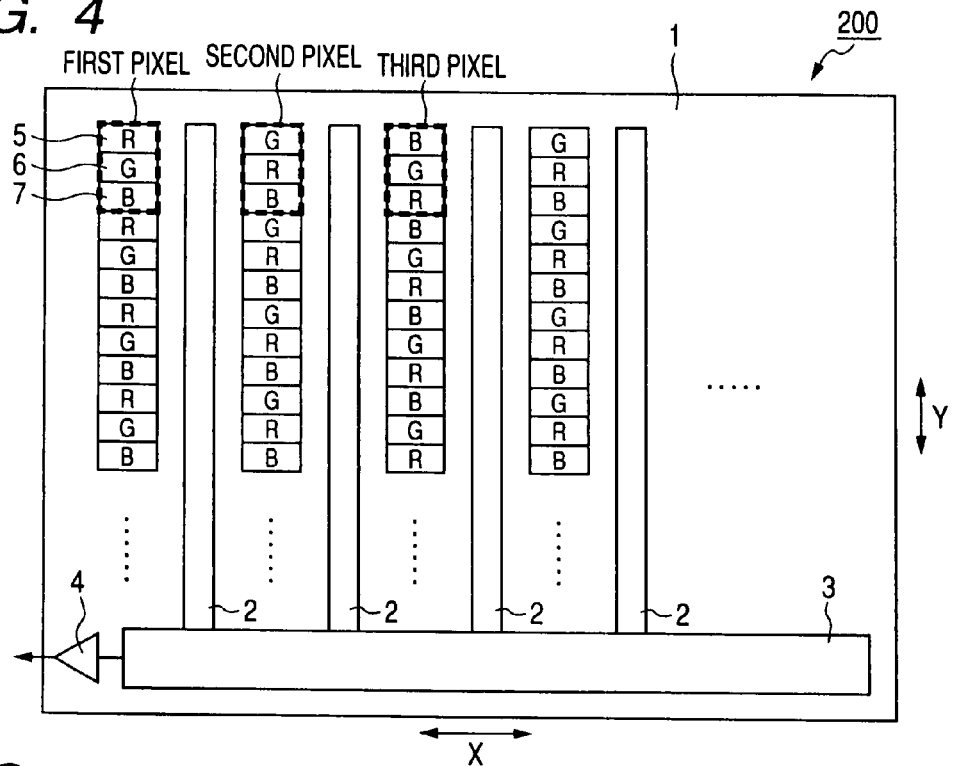
FIG. 4 is a diagrammatic plan view of a variation of the solid-state imaging device for describing the first embodiment of the invention.

Although in this embodiment the pixel arrangements are different for the odd and even rows, the configuration shown in FIG. 4 may be employed in which the pixel arrangement of the even rows shown in FIG. 1 is replaced by the pixel arrangement of the odd rows shown in FIG. 1 so that the pixel arrangements are the same for the odd and even rows. With the configuration shown in FIG. 4, color image data with maximum resolution can be produced in video acquisition only with signals read out from the first array. In a solid-state imaging device 200 shown in FIG. 4, the processing time for video acquisition is longer than in the solid-state imaging device 100 because signals are read out from all of the pixels, but nevertheless can be shorter than required in the related art. On the other hand, the solid-state imaging device 200 allows higher resolution video acquisition than the solid-state imaging device 100. Even with the configuration shown in FIG. 4, video acquisition as fast as achieved in FIG. 1 is still possible by driving the solid-state imaging device 200 to read out signals only from the fourth arrays in video acquisition.

Although the fourth array in the example of FIG. 1 has a longitudinal stripe layout in which all of the signal charge accumulators 5 to 7 are included, the fourth array is not necessarily configured as above but any one of the fourth to sixth arrays may have the longitudinal stripe layout in which all of the signal charge accumulators 5 to 7 are included. Similarly, although the first array in the example of FIG. 4 has the longitudinal stripe layout in which all of the signal charge accumulators 5 to 7 are included, the first array is not necessarily configured as above but any one of the first to third arrays may have the longitudinal stripe layout in which all of the signal charge accumulators 5 to 7 are included.

Although the eighth array in the example of FIG. 1 is arranged only with the signal charge accumulators 6, the eighth array is not necessarily configured as above but any one of the seventh to ninth arrays may be arranged only with the signal charge accumulators 6.

Second Embodiment

In a solid-state imaging device 300 for describing this embodiment, the signal charge accumulators 5 to 7 are reconfigured such that each of the first to third arrays of the solid-state imaging device 200 shown in FIG. 4 has a longitudinal stripe layout in which all of the signal charge accumulators 5 to 7 are included.

Figure 5:
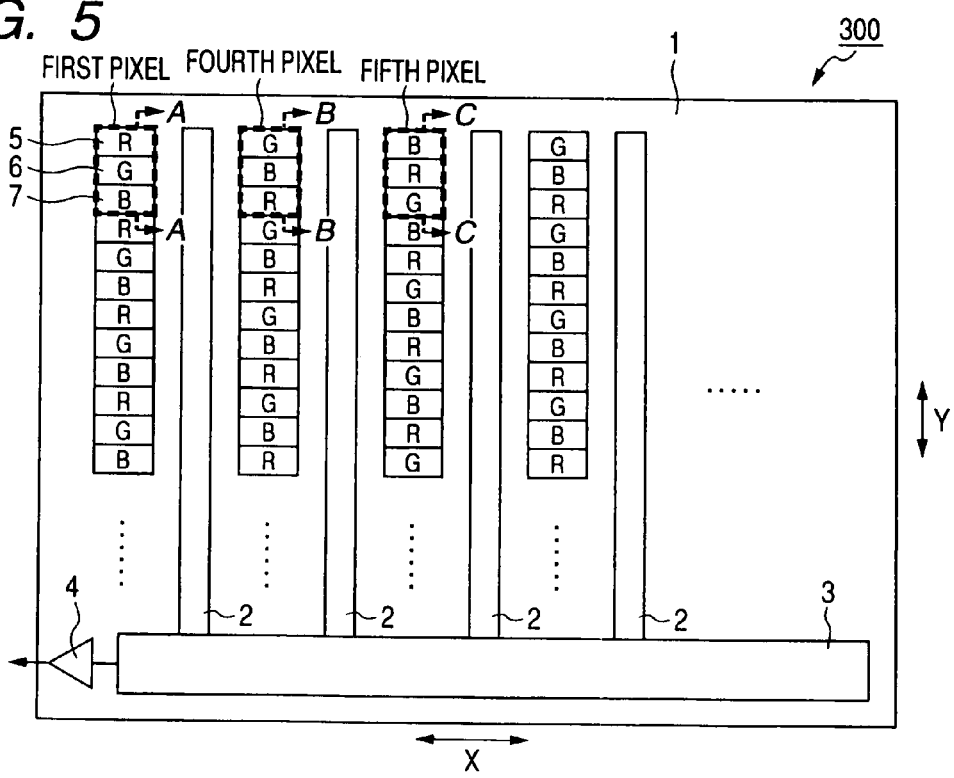
FIG. 5 is a diagrammatical plan view of a solid-state imaging device for describing a second exemplary embodiment of the invention.
Figure 6A:
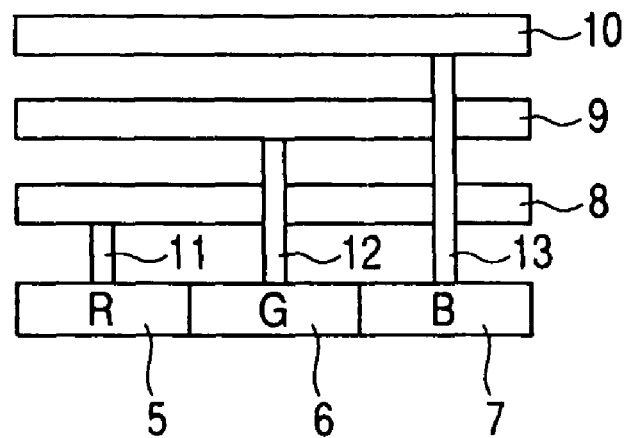
FIG. 6A is a diagrammatic sectional view of the solid-state imaging device taken along the line A-A shown in FIG. 5.
Figure 6B:
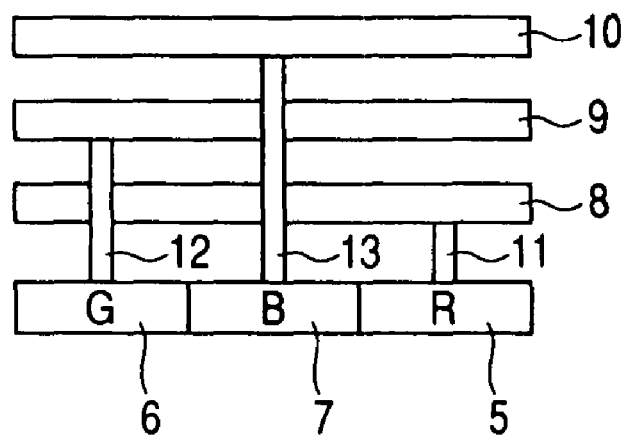
FIG. 6B is a diagrammatic sectional view of the solid-state imaging device taken along the line B-B shown in FIG. 5.
Figure 6C:
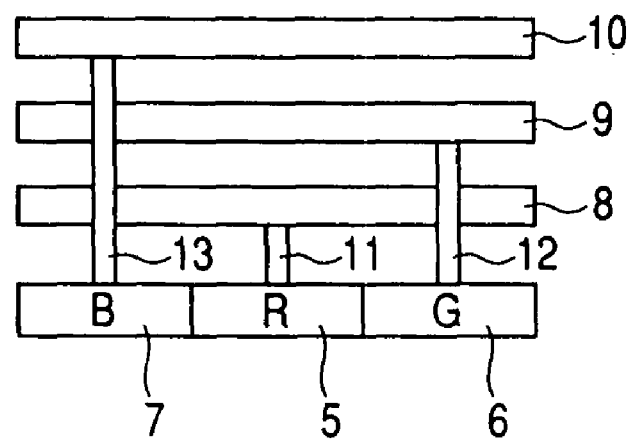
FIG. 6C is a diagrammatic sectional view of the solid-state imaging device taken along the line C-C shown in FIG. 5.

FIG. 5 is a diagrammatical plan view of a solid-state imaging device for describing the second embodiment of the invention. FIG. 6A is a diagrammatic sectional view of the solid-state imaging device taken along the line A-A shown in FIG. 5. FIG. 6B is a diagrammatic sectional view of the solid-state imaging device taken along the line B-B shown in FIG. 5. FIG. 6C is a diagrammatic sectional view of the solid-state imaging device taken along the line C-C shown in FIG. 5. In FIGS. 5 and 6A to 6C, similar structures to those in FIGS. 2 and 4 have the same characters.

Among a large number of pixels of the solid-state imaging device 300, there are included the first pixel having the signal charge accumulator 5, the signal charge accumulator 6, and the signal charge accumulator 7 arranged columnwise in this order, a fourth pixel having the signal charge accumulator 6, the signal charge accumulator 7, and the signal charge accumulator 5 arranged columnwise in this order, and a fifth pixel having the signal charge accumulator 7, the signal charge accumulator 5, and the signal charge accumulator 6 arranged columnwise in this order. Every row has the first pixel, fourth pixel, fifth pixel, and fourth pixel arranged repeatedly in this order in the row direction.

Figure 7A:
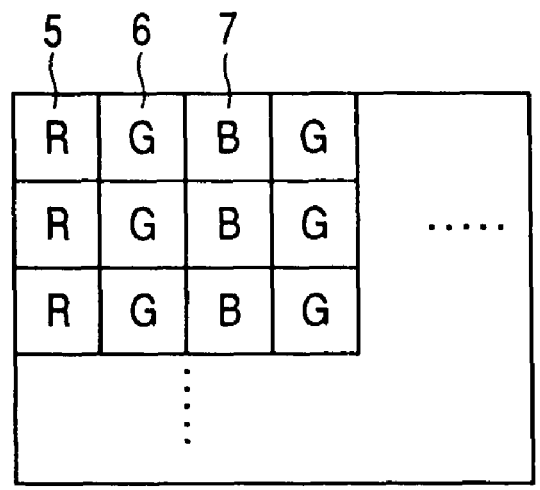
FIG. 7A shows the first array of the solid-state imaging device shown in FIG. 6A-FIG. 6C.
Figure 7B:
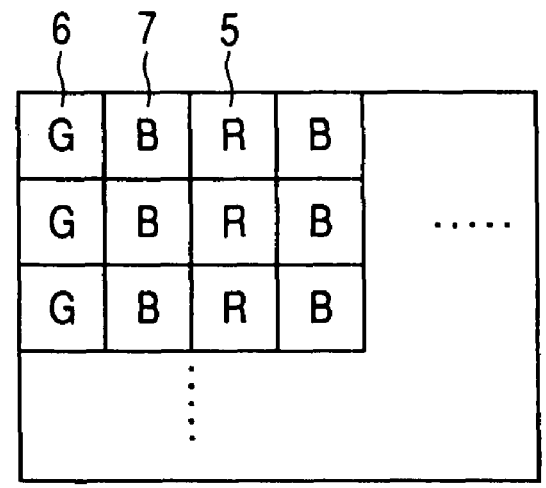
FIG. 7B shows the second array of the solid-state imaging device shown in FIG.6A-FIG. 6C.
Figure 7C:
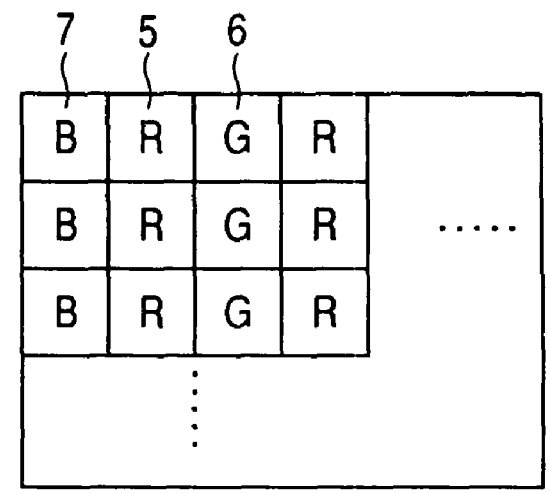
FIG. 7C shows the third array of the solid-state imaging device shown in FIG. 6A-FIG. 6C.

With regard to the three arrays of the first, second, and third arrays in the solid-state imaging device 300, the signal charge accumulators 5 to 7 are arranged on the surface of the semiconductor substrate 1 such that each of the first to third arrays has all of the three signal charge accumulators 5 to 7, for example, as illustrated in the arrangement in FIG. 7A to 7C.

FIG. 7A shows the first array of the solid-state imaging device 300. FIG. 7B shows the second array of the solid-state imaging device 300. FIG. 7C) shows the third array of the solid-state imaging device 300. As shown in FIGS. 7A to 7C, each of the first to third arrays has a so-called longitudinal stripe layout in which the following columns are arranged in the row direction; a column in which the signal charge accumulators 5 are arranged columnwise, a column in which the signal charge accumulators 6 are arranged columnwise, and a column in which the signal charge accumulators 7 are arranged columnwise. Thus, color image data can be produced using the signals read out from any one of the first to third arrays. Accordingly, in video acquisition, high-resolution and high-speed video acquisition can be achieved as in the solid-state imaging device 200 shown in FIG. 4 by reading out signals from any one of the first to third arrays to produce color image data.

Because color image data can be produced using the signals read out from any one of the first to third arrays, even higher-speed video acquisition or high-speed, continuous shooting of still images can be achieved by offsetting the timings (open/close timings of electronic shutters) of starting accumulation of signal charges in the signal charge accumulators of each of the first to third arrays with respect to one another.

Figure 8:
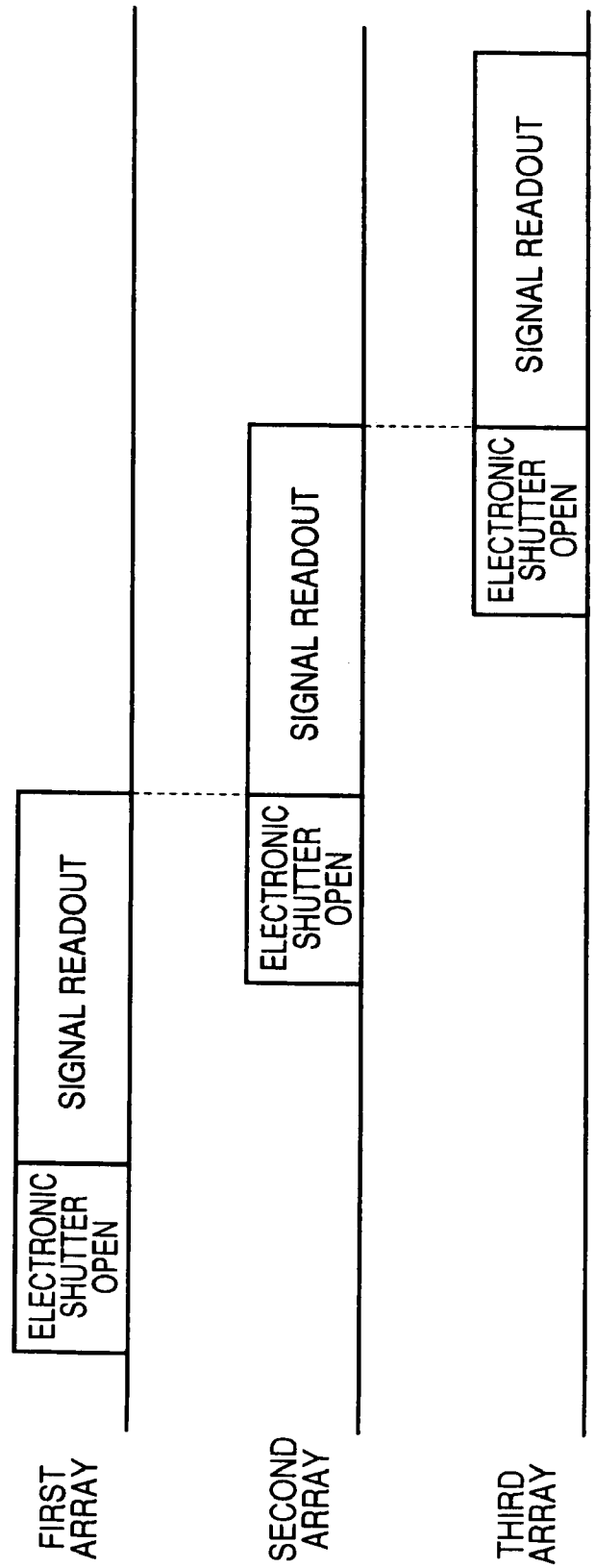
FIG. 8 is a timing chart showing a drive method of the solid-state imaging device for describing the second embodiment of the invention.

For example, as shown in FIG. 8, firstly an electronic shutter of the first array is open and signal charges generated in the photoelectric conversion layers are accumulated. Then, the electronic shutter is closed and the signals corresponding to the accumulated signal charges are read out. During the signal readout from the first array, an electronic shutter of the second array is open and signal charges generated in the photoelectric conversion layers are accumulated. The electronic shutter is closed when the signal readout from the first array is completed, and the signals corresponding to the accumulated signal charges are read out. Furthermore, during the signal readout from the second array, an electronic shutter of the third array is open and signal charges generated in the photoelectric conversion layers are accumulated. The electronic shutter is closed when the signal readout from the second array is completed, and the signals corresponding to the accumulated signal charges are read out.

In this way, three color image data acquired at different timings can be quickly produced. By using those three color image data acquired in rapid succession as still image data to form video image data or simply as still image data, high-speed video acquisition or high-speed, continuous shooting of three still images can be achieved.

Even higher-speed video acquisition is possible with the solid-state imaging device 300, as with the solid-state imaging device 100, by configuring it such that a row of pixels (which becomes an even row) is added in between each row of the pixels shown in FIG. 5 and reading out signals only from pixels in the odd rows to produce color image data. In this case, the arrangement of the pixels of the added even rows is preferably similar to that of FIG. 1, although not limited to a specific arrangement.

Third Embodiment

In a solid-state imaging device 400 for describing this embodiment, the signal charge accumulators 5 to 7 are reconfigured such that the first array of the solid-state imaging device 200 shown in FIG. 4 has a lateral stripe layout in which all of the signal charge accumulators 5 to 7 are included.

Figure 9:
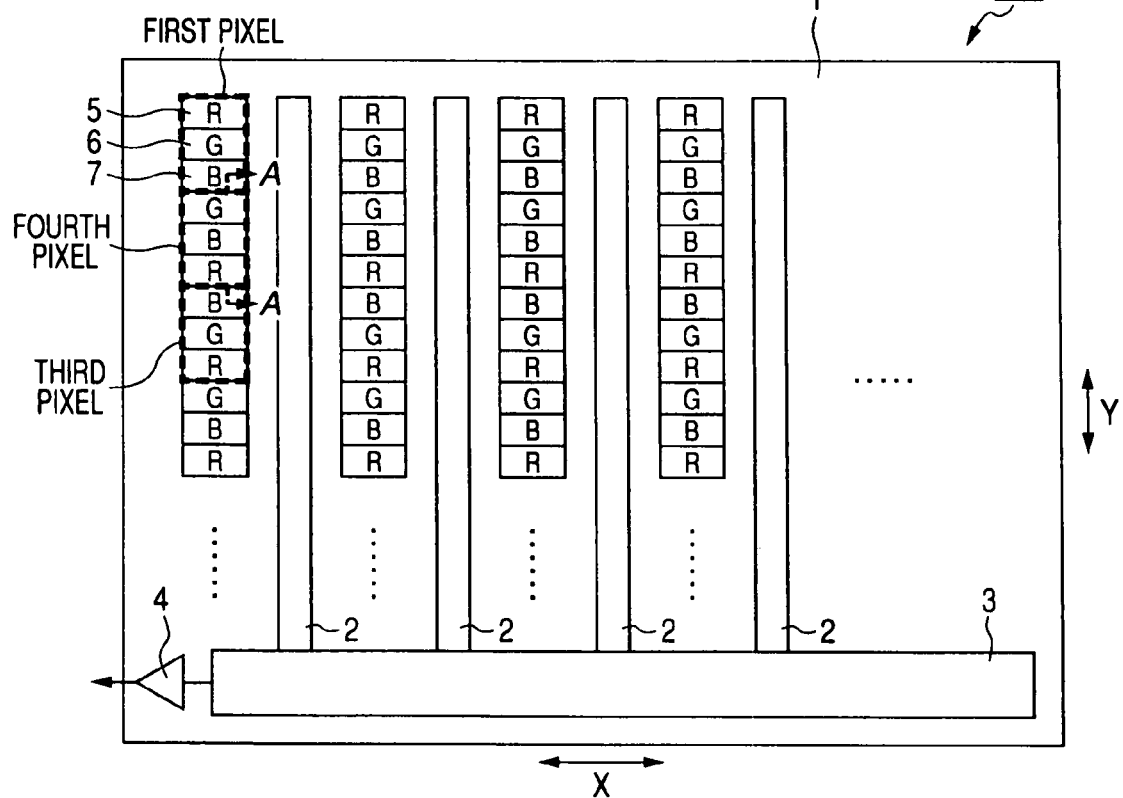
FIG. 9 is a diagrammatical plan view of a solid-state imaging device for describing a third exemplary embodiment of the invention.
Figure 10:
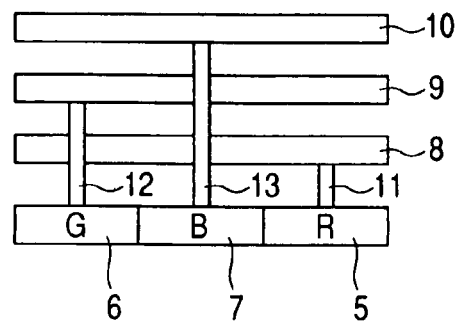
FIG. 10 is a diagrammatic sectional view of the solid-state imaging device taken along the line A-A shown in FIG. 9.

FIG. 9 is a diagrammatical plan view of a solid-state imaging device for describing the third embodiment of the invention. FIG. 10 is a diagrammatic sectional view of the solid-state imaging device taken along the line A-A shown in FIG. 9. In FIGS. 9 and 10, similar structures to those in FIGS. 2 and 4 have the same characters.

Among a large number of pixels of the solid-state imaging device 400, there are included the first pixel having the signal charge accumulator 5, the signal charge accumulator 6, and the signal charge accumulator 7 arranged columnwise in this order, the fourth pixel having the signal charge accumulator 6, the signal charge accumulator 7, and the signal charge accumulator 5 arranged columnwise in this order, and the third pixel having the signal charge accumulator 7, the signal charge accumulator 6, and the signal charge accumulator 5 arranged columnwise in this order. Every column has the first pixel, fourth pixel, third pixel, and fourth pixel arranged repeatedly in this order in the column direction.

Figure 11:
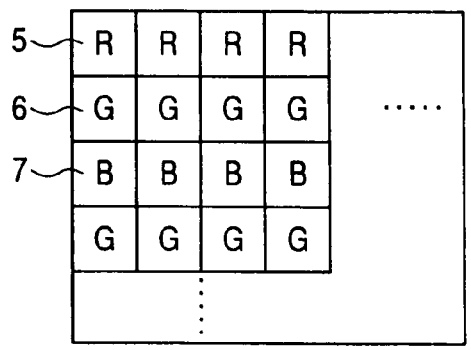
FIG. 11 shows the first array of the solid-state imaging device for describing the third embodiment of the invention.

With regard to the three arrays of the first, second, and third arrays in the solid-state imaging device 400, the signal charge accumulators 5 to 7 are arranged on the surface of the semiconductor substrate 1 such that the first array has all of the three signal charge accumulators 5 to 7, for example, as illustrated in the lateral stripe layout in FIG. 11.

FIG. 11 shows the first array of the solid-state imaging device 400. As shown in FIG. 11, the first array has a so-called lateral stripe layout in which the following rows (sub-rows) are arranged in the column direction; a row in which the signal charge accumulators 5 are arranged rowwise, a row in which the signal charge accumulators 6 are arranged rowwise, and a row in which the signal charge accumulators 7 are arranged rowwise. Thus, color image data can be produced only with the signals read out from the first array. Accordingly, high-speed video acquisition can be achieved without having to read out signals from each of the first to third arrays as conventionally performed.

Although the first array in this embodiment has a lateral stripe layout in which all of the signal charge accumulators 5 to 7 are included, the first array is not necessarily configured as above but any one of the first to third arrays may have the lateral stripe layout in which all of the signal charge accumulators 5 to 7 are included.

Even higher-speed video acquisition is possible with the solid-state imaging device 400, as with the solid-state imaging device 100, by configuring it such that a row of pixels (which becomes an even row) is added in between each row of the pixels shown in FIG. 9 and reading out signals only from pixels in the odd rows to produce color image data. In this case, the arrangement of the pixels of the added even rows is preferably similar to that of FIG. 1, although not limited to a specific arrangement.

Fourth Embodiment

In a solid-state imaging device 500 for describing this embodiment, the signal charge accumulators 5 to 7 are reconfigured such that each of the first to third arrays of the solid-state imaging device 400 shown in FIG. 9 has a lateral stripe layout in which all of the signal charge accumulators 5 to 7 are included.

Figure 12:
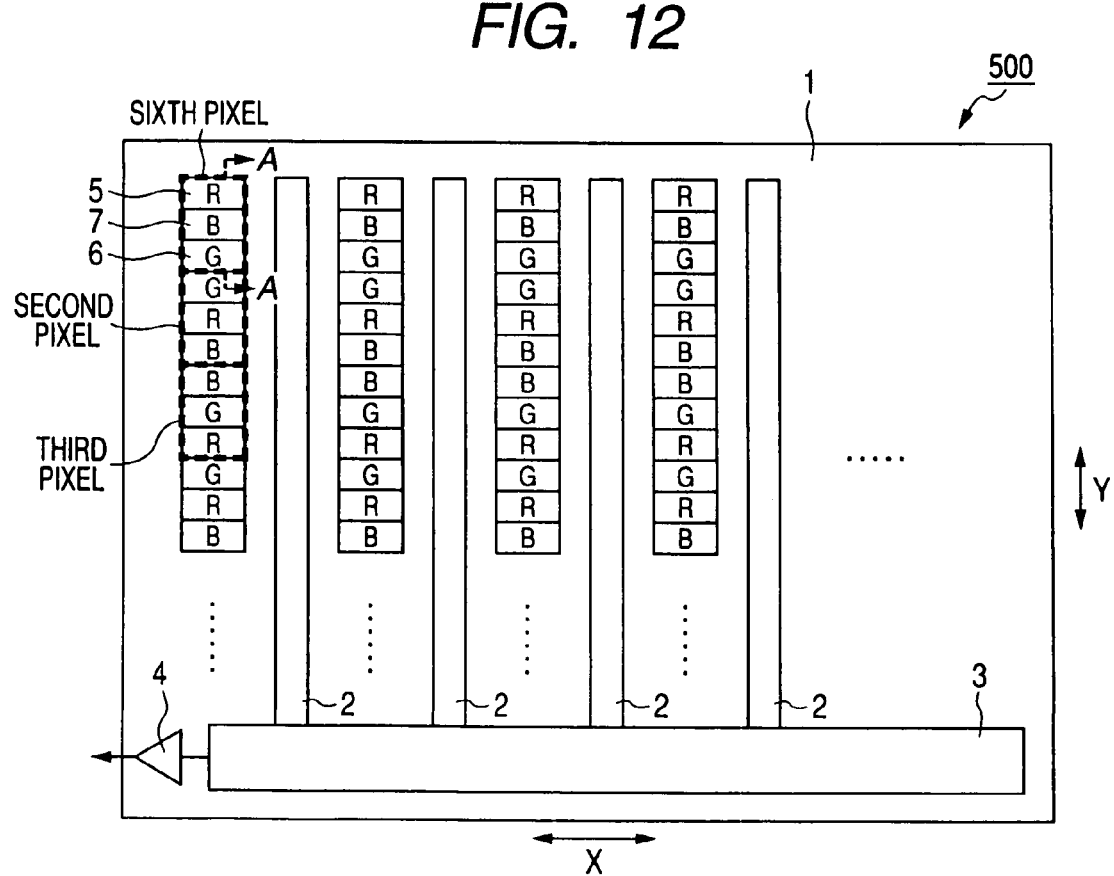
FIG. 12 is a diagrammatical plan view of a solid-state imaging device for describing a fourth exemplary embodiment of the invention.
Figure 13:
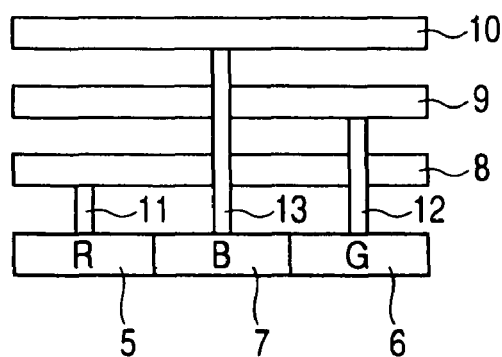
FIG. 13 is a diagrammatic sectional view of the solid-state imaging device taken along the line A-A shown in FIG. 12.

FIG. 12 is a diagrammatical plan view of a solid-state imaging device for describing the fourth embodiment of the invention FIG. 13 is a diagrammatic sectional view of the solid-state imaging device taken along the line A-A shown in FIG. 12. In FIGS. 12 and 13, similar structures to those in FIGS. 9 and 10 have the same characters.

Among a large number of pixels of the solid-state imaging device 500, there are included a sixth pixel having the signal charge accumulator 5, the signal charge accumulator 7, and the signal charge accumulator 6 arranged columnwise in this order, the second pixel having the signal charge accumulator 6, the signal charge accumulator 5, and the signal charge accumulator 7 arranged columnwise in this order, and the third pixel having the signal charge accumulator 7, the signal charge accumulator 6, and the signal charge accumulator 5 arranged columnwise in this order. Every column has the sixth pixel, second pixel, third pixel, and second pixel arranged repeatedly in this order in the column direction.

Figure 14A:
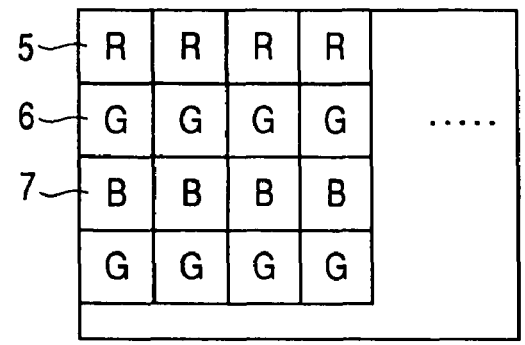
FIG. 14A shows the first array of the solid-state imaging device for describing the fourth embodiment of the invention.
Figure 14B:
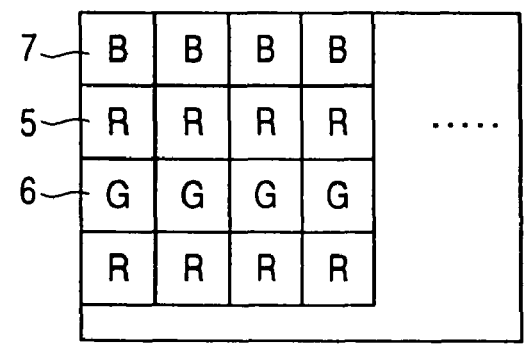
FIG. 14B shows the second array of the solid-state imaging device for describing the fourth embodiment of the invention.
Figure 14C:
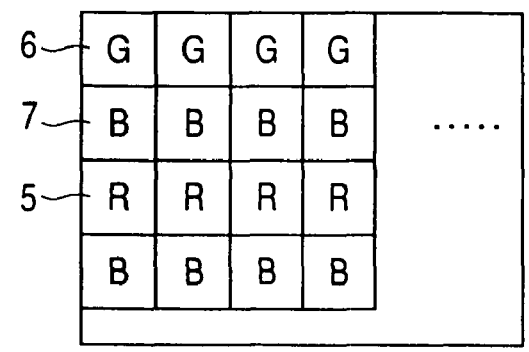
FIG. 14C shows the third array of the solid-state array for describing the fourth embodiment of the invention.

With regard to the three arrays of the first, second, and third arrays in the solid-state imaging device 500, the signal charge accumulators 5 to 7 are arranged on the surface of the semiconductor substrate 1 such that each of the first to third arrays has all of the three signal charge accumulators 5 to 7, for example, as illustrated in the lateral stripe layout in FIGS. 14A to 14C.

FIG. 14A shows the first array of the solid-state imaging device 500. FIG. 14B shows the second array of the solid-state imaging device 500. FIG. 14C shows the third array of the solid-state array 500. As shown in FIGS. 14A to 14C, each of the first to third arrays has a so-called lateral stripe layout in which the following rows (sub-rows) are arranged in the column direction; a row in which the signal charge accumulators 5 are arranged rowwise, a row in which the signal charge accumulators 6 are arranged rowwise, and a row in which the signal charge accumulators 7 are arranged rowwise. Thus, color image data can be produced using the signals read out from any one of the first to third arrays. Accordingly, in video acquisition, high-resolution and high-speed video acquisition can be achieved as in the solid-state imaging device 200 shown in FIG. 4 by reading out signals from any one of the first to third arrays to produce color image data.

Because color image data can be produced using the signals read out from any one of the first to third arrays, even higher-speed video acquisition or high-speed, continuous shooting of still images can be achieved by offsetting the timings (open/close timings of electronic shutters) of stating accumulation of signal charges in the signal charge accumulators of each of the first to third arrays with respect to each other as shown in FIG. 8.

Even higher-speed video acquisition is possible with the solid-state imaging device 500, as with the solid-state imaging device 100, by configuring it such that a row of pixels (which becomes an even row) is added in between each row of the pixels shown in FIG. 12 and reading out signals only from pixels in the odd rows to produce color image data. In this case, the arrangement of the pixels of the added even rows is preferably similar to that of FIG. 1, although not limited to a specific arrangement.

Fifth Embodiment

In a solid-state imaging device 600 for describing this embodiment, the signal charge accumulators 5 to 7 are reconfigured such that the first array of the solid-state imager 200 shown in FIG. 4 has a Bayer layout in which all of the signal charge accumulators 5 to 7 are included.

Figure 15:
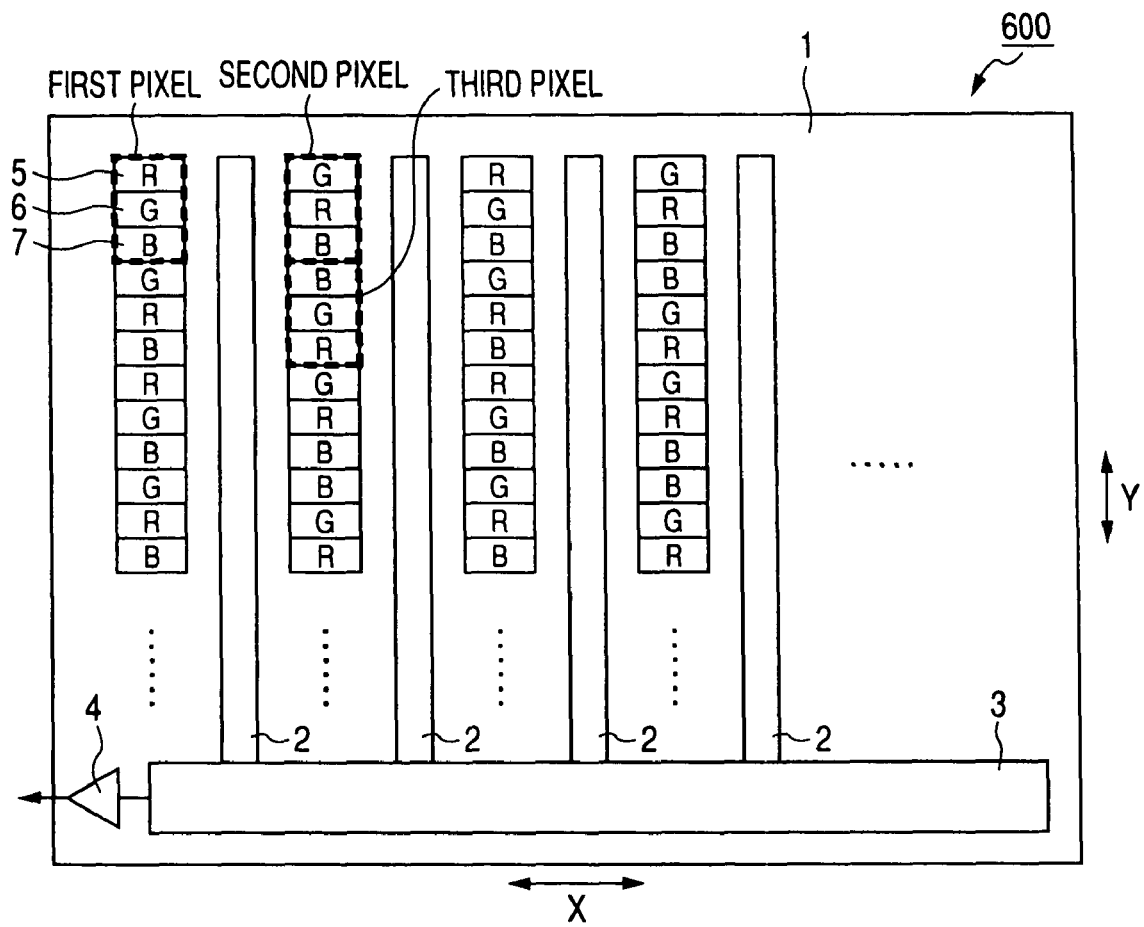
FIG. 15 is a diagrammatic plan view of a solid-state imaging device for describing a fifth exemplary embodiment of the invention.

FIG. 15 is a diagrammatical plan view of a solid-state imaging device for describing the fifth embodiment of the invention. In FIG. 15, similar structures to those in FIG. 4 have the same characters. Among a large number of pixels of the solid-state imaging device 600, there are included the first pixel having the signal charge accumulator 5, the signal charge accumulator 6, and the signal charge accumulator 7 arranged columnwise in this order, the second pixel having the signal charge accumulator 6, the signal charge accumulator 5, and the signal charge accumulator 7 arranged columnwise in this order, and the third pixel having the signal charge accumulator 7, the signal charge accumulator 6, and the signal charge accumulator 5 arranged columnwise in this order.

Odd rows have the first and second pixels arranged alternately in this order in the row direction, while even rows have the second and third pixels arranged alternately in this order in the row direction.

Figure 16:
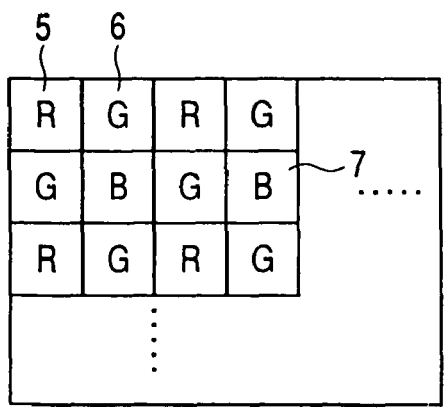
FIG. 16 shows the first array of the solid-state imaging device for describing the fifth embodiment of the invention.

With regard to the three arrays of the first, second, and third arrays in the solid-state imaging device 600, the signal charge accumulators 5 to 7 are arranged on the surface of the semiconductor substrate 1 such that the first array has all of the three signal charge accumulators 5 to 7, for example, as illustrated in the Bayer layout in FIG. 16.

FIG. 16 shows the first array of the solid-state imaging device 600. As shown in FIG. 16, the first array has a Bayer layout in which the following rows (sub-rows) are alternately arranged in the column direction; a row in which the signal charge accumulators 5 and 6 are alternately arranged in the row direction, and a row in which the signal charge accumulators 6 and 7 are alternately arranged in the row direction. Accordingly, in video acquisition, high-resolution and high-speed video acquisition can be achieved as in the solid-state imaging device 200 shown in FIG. 4 by reading out signals only from the first array to produce color image data.

Although the first array in this embodiment has a Bayer layout in which all of the signal charge accumulators 5 to 7 are included, the first array is not necessarily configured as above but any one of the first to third arrays may have the Bayer layout in which all of the signal charge accumulators 5 to 7 are included.

Even higher-speed video acquisition is possible with the solid-state imaging device 600, as with the solid-state imaging device 100, by configuring it such that a row of pixels (which becomes an even row) is added in between each row of the pixels shown in FIG. 15 and reading out signals only from pixels in the odd rows to produce color image data. In this case, the arrangement of the pixels of the added even rows is preferably similar to that of FIG. 1, although not limited to a specific arrangement.

Sixth Embodiment

In a solid-state imaging device 700 for describing this embodiment, the signal charge accumulators 5 to 7 are reconfigured such that each of the first to third arrays of the solid-state imaging device 200 shown in FIG. 4 has a Bayer layout in which all of the signal charge accumulators 5 to 7 are included.

Figure 17:
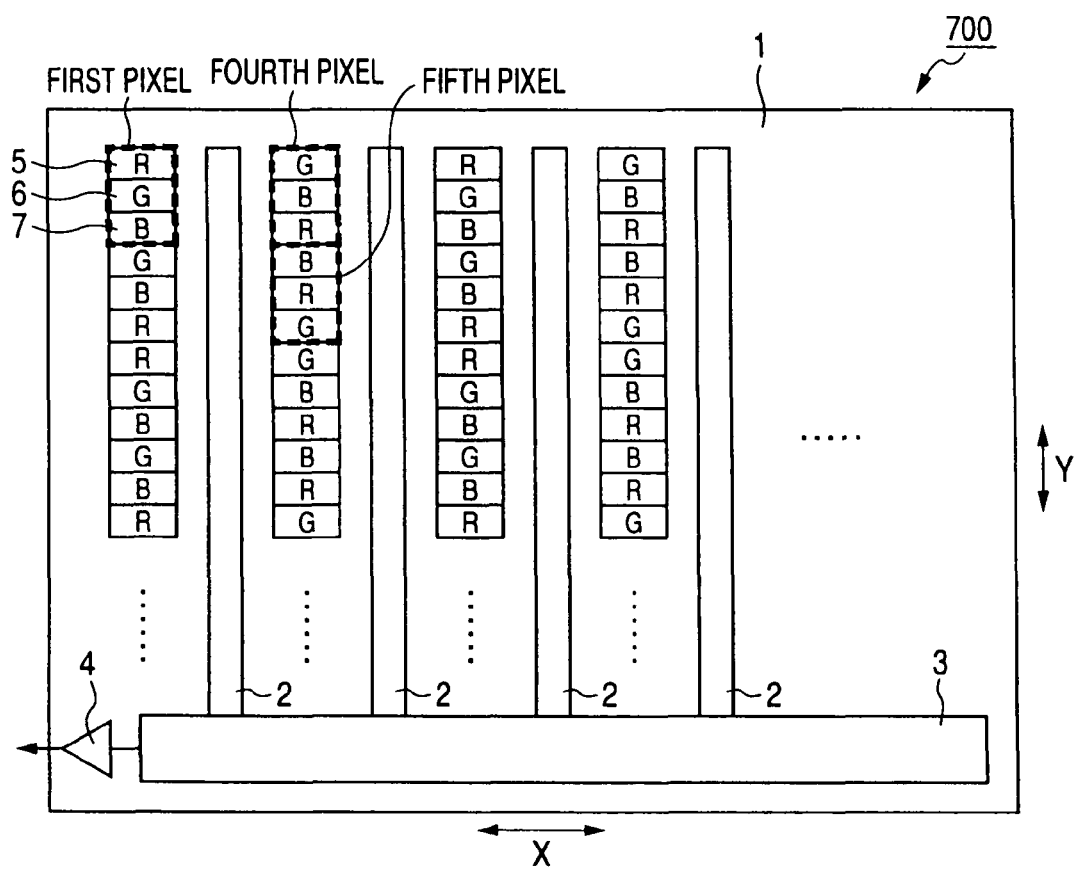
FIG. 17 is a diagrammatical plan view of a solid-state imaging device for describing a sixth exemplary embodiment of the invention.

FIG. 17 is a diagrammatical plan view of a solid-state imaging device for describing the sixth embodiment of the invention. In FIG. 17, similar structures to those in FIG. 4 have the same characters.

Among a large number of pixels of the solid-state imaging device 700, there are included the first pixel having the signal charge accumulator 5, the signal charge accumulator 6, and the signal charge accumulator 7 arranged columnwise in this order, the fourth pixel having the signal charge accumulator 6, the signal charge accumulator 7, and the signal charge accumulator 5 arranged columnwise in this order, and the fifth pixel having the signal charge accumulator 7, the signal charge accumulator 5, and the signal charge accumulator 6 arranged columnwise in this order. Odd rows have the first and fourth pixels arranged alternately in this order in the row direction, while even rows have the fourth and fifth pixels arranged alternately in this order in the row direction.

Figure 18A:
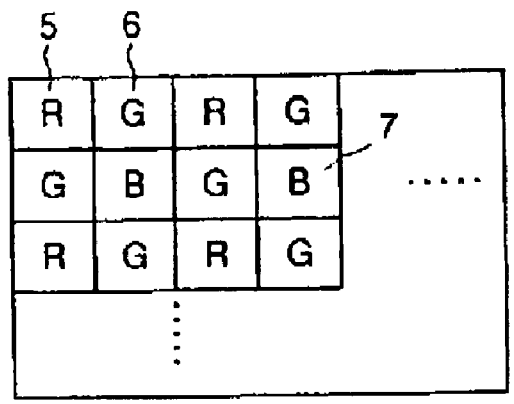
FIG. 18A shows the first array of the solid-state imaging device for describing the sixth embodiment of the invention.
Figure 18B:
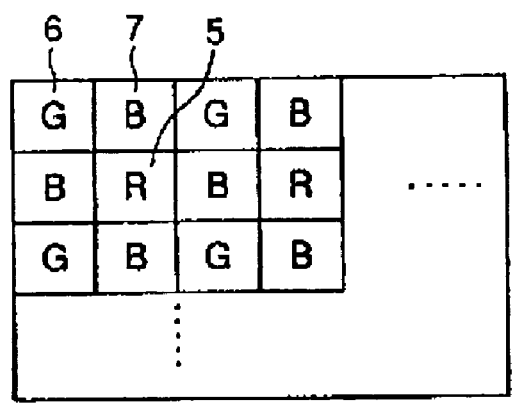
FIG. 18B shows the second array of the solid-state imaging device for describing the sixth embodiment of the invention.
Figure 18C:
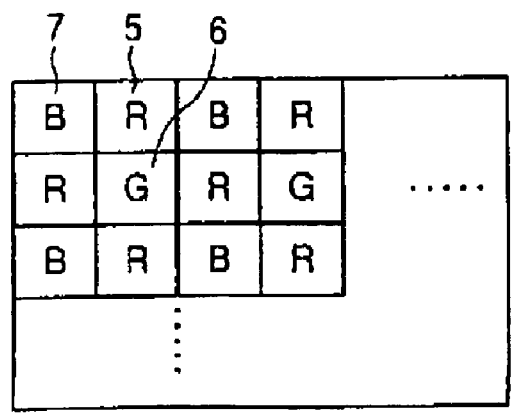
FIG. 18C shows the third array of the solid-state imaging device for describing the sixth embodiment of the invention.

With regard to the three arrays of the first, second, and third arrays in the solid-state imaging device 700, the signal charge accumulators 5 to 7 are arranged on the surface of the semiconductor substrate 1 such that each of the first to third arrays has all of the three signal charge accumulators 5 to 7, for example, as illustrated in the Bayer layout in FIGS. 18A to 18C.

FIG. 18A shows the first array of the solid-state imaging device 700. FIG. 18B shows the second array of the solid-state imaging device 700. FIG. 18C shows the third array of the solid-state imaging device 700. As shown in FIG. 18A, the first array has a so-called Bayer layout in which the following rows (sub-rows) are alternately arranged in the column direction; a row in which the signal charge accumulators 5 and 6 are alternately arranged in the row direction, and a row in which the signal charge accumulators 6 and 7 are alternately arranged in the row direction. Similarly, as shown in FIG. 18B, the second array has a so-called Bayer layout in which the following rows (sub-rows) are alternately arranged in the column direction; a row in which the signal charge accumulators 6 and 7 are alternately arranged in the row direction, and a row in which the signal charge accumulators 7 and 5 are alternately arranged in the row direction. Yet similarly, as shown in FIG. 18C, the third array has a so-called Bayer layout in which the following rows (sub-rows) are alternately arranged in the column direction; a row in which the signal charge accumulators 7 and 5 are alternately arranged in the row direction, and a row in which the signal charge accumulators 5 and 6 are alternately arranged in the row direction.

Thus, color image data can be produced using the signals read out from any one of the first to third arrays. Accordingly, in video acquisition, high-resolution and high-speed video acquisition can be achieved as in the solid-state imaging device 200 shown in FIG. 4 by reading out signals from any one of the first to third arrays to produce color image data.

Because color image data can be produced using the signals read out from any one of the first to third arrays, even higher-speed video acquisition or high-speed, continuous shooting of still images can be achieved by offsetting the timings (open/close timings of electronic shutters) of starting accumulation of signal charges in the signal charge accumulators of each of the first to third arrays with respect to each other as shown in FIG. 8.

Even higher-speed video acquisition is possible with the solid-state imaging device 700, as with the solid-state imaging device 100, by configuring it such that a row of pixels (which becomes an even row) is added in between each row of the pixels shown in FIG. 17 and reading out signals only from pixels in the odd rows to produce color image data. In this case, the arrangement of the pixels of the added even rows is preferably similar to that of FIG. 1, although not limited to a specific arrangement.

Although in the first to sixth embodiments, the solid-state imaging devices is a so-called interline imaging device in which signal charge accumulators 5 to 7 and the vertical transfer portions 2 are separately provided, those imaging device may be a frame-transfer solid-state imaging device in which signal charge accumulators 5 to 7 also function as the vertical transfer portions 2. In this case, it is required to provide a drain between the signal charge accumulators 5 to 7 and the horizontal transfer portion 3 for dumping signal charges, other than those intended to be read out, into the semiconductor substrate 1. For example, in the frame transfer operation, if signal charge readout only from the first array is desired, unintended signals are also read out from the second and third arrays and transferred. Therefore, from all signal charges transferred in the vertical direction, signal charges read out from the second and third arrays are dumped into the drain, and only signal charges read out from the first array are transferred through the horizontal transfer portion 3, allowing signals to be read out only from the first array.

Seventh Embodiment

Figure 19:
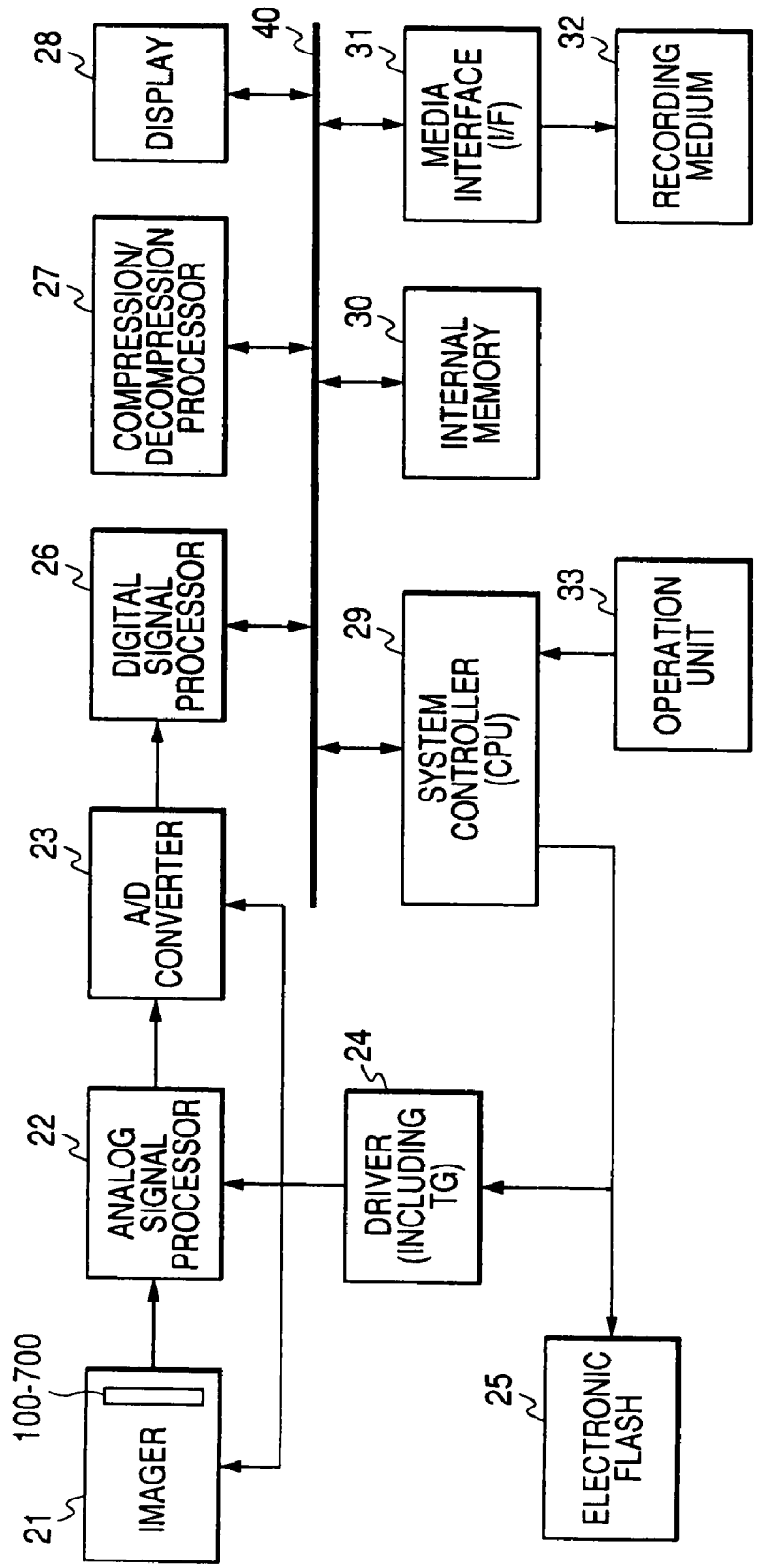
FIG. 19 shows a schematic configuration of a digital camera for describing a seventh exemplary embodiment of the invention.

FIG. 19 shows a block diagram of a digital camera for describing a seventh embodiment of the invention. The digital camera shown in FIG. 19 includes an imager 21, an analog signal processor 22, an analog-to-digital (A/D) converter 23, a driver 24, an electronic flash 25, a digital signal processor 26, a compression/decompression processor 27, a display 28, a system controller 29, an internal memory 30, a media interface 31, a recording medium 32, and an operation unit 33. The digital signal processor 26, the compression/decompression processor 27, the display 28, the system controller 29, the internal memory 30, and the media interface 31 are connected to a system bus 40.

The imager 21 acquires an image of a subject through an optical system such as an imaging lens and any one of the solid-state imaging devices 100 to 700 described in the first to sixth embodiments, and outputs an analog image signal. The analog signal processor 22 performs a predetermined analog signal processing on the image signal acquired by the imager 21. The A/D converter 23 converts the analog signal processed in the analog signal processor 22 into a digital signal.

In image acquisition, the optics is controlled through the driver 24. Any one of the solid-state imaging devices 100 to 700 is driven by a drive signal from a timing generator (designated as TG in FIG. 19) incorporated in the driver 24 at a timing triggered by the ON state of a release switch (not shown) operated through a release button (not shown) that is part of the operation unit 33. The system controller 29 controls the driver 24 to output a drive signal.

The digital signal processor 26 performs a digital signal processing on the digital signal from the A/D converter 23 according to the operation mode set through the operation unit 33. The processing performed in the digital signal processor 26 includes black level correction (OB processing), linear matrix correction, white balance adjustment, gamma correction, pixel data processing, and Y/C conversion, and the like. The digital signal processor 26 is formed of a DSP, for example.

The compression/decompression processor 27 compresses the Y/C data from the digital signal processor 26 and decompresses the compressed image data from the recording medium 32.

The display 28 comprises an LCD display, for example, and displays images based on image data captured and undergone the digital signal processing. The displays 28 also displays images based on image data obtained through decompression of compressed image data recorded in the recording medium. The displays 28 can also display raw images during acquisition, various statuses of the digital camera, information on operations, and the like.

The internal memory 30 is a DRAM, for example, and is used as a work memory for the digital signal processor 26 or the system controller 29, as well as a buffer memory for temporally storing acquired image data to be recorded in the recording medium 32 or a buffer memory for image data to be displayed on the display 28. The media interface 31 performs data input/output operations for the recording medium 32 such as a memory card.

The system controller 29 is mainly formed of a processor that operates through a predetermined program, and has control over the whole digital camera including image acquisition operations.

The operation unit 33 is a portion through which various operations are performed when the digital camera is in use.

With the digital camera according to the embodiment, high-speed video acquisition or still image acquisition can be achieved by devising driving methods of any one of the solid-state imaging devices 100 to 700 with the aid of the driver 24.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-37622, filed Feb. 15 of 2005, the contents of which is incorporated herein by reference.

What is claimed is:

1. A solid-state imaging device comprising:
a semiconductor substrate;
a plurality of photoelectric conversion layers comprising three photoelectric conversion layers stacked above the semiconductor substrate, each detecting a different color from the others of the three photoelectric conversion layers,
a plurality of signal charge accumulators comprising three signal charge accumulators in the semiconductor substrate, each accumulating signal charges generated in a corresponding layer of the three photoelectric conversion layers; and
a signal readout circuit in the semiconductor substrate, the signal readout circuit reading out signals corresponding to the signal charges accumulated in the three signal charge accumulators,
wherein a plurality of pixels is arranged in a square lattice pattern on a surface of the semiconductor substrate, the square lattice pattern extending in a column direction and a row direction perpendicular to the column direction, the column and row direction being parallel to the surface of the semiconductor substrate, and each of the pixels comprising the three signal charge accumulators which are arranged in the column direction on the surface of the semiconductor substrate,
wherein an arrangement of the pixels is such that the square lattice pattern of the pixels includes a first pixel row comprising:
a first array comprising signal charge accumulators in a first sub-row of each pixel in the first pixel row;
a second array comprising signal charge accumulators arranged in a second sub-row of each pixel in the first pixel row; and
a third array comprising signal charge accumulators in a third sub-row of each pixel in first pixel row,
wherein the three signal charge accumulators are arranged such that each of the first, second and third arrays includes all of the three signal charge accumulators, and
wherein the three signal charge accumulators are provided apart from the three photoelectric conversion layers and are electrically connected to the three photoelectric conversion layers via respective wirings, and the signal charges accumulating in the three signal charge accumulators are transferred through the respective wirings from the three photoelectric conversion layers.

2. The solid-state imaging device according to claim 1, wherein the first array, second array and third array comprise a longitudinal stripe layout.

3. The solid-state imaging device according to claim 1, wherein a part of all rows of the pixels arranged in the surface of the semiconductor substrate comprises the first pixel row.

4. The solid-state imaging device according to claim 3, wherein the three photoelectric conversion layers include a green-light photoelectric conversion layer detecting green light, and
wherein the square lattice pattern of the pixels includes a second pixel row other than the first pixel row, the second pixel array comprises: a first array of signal charge accumulators in a first sub-row of each pixel in the second pixel row; a second array of signal charge accumulators in the second sub-row of each pixel in the second pixel row; and a third array of signal charge accumulators in a third sub-row of each pixel in the second pixel row, and the three signal charge accumulators are arranged such that at least one of the first, second and third arrays is an array including only the signal charge accumulators accumulating the signal charges generated in the green-light photoelectric conversion layers.

5. The solid-state imaging device according to claim 2, wherein the signals are read out from the array of the longitudinal stripe layout to achieve video acquisition.

6. The solid-state imaging device according to claim 1, wherein the signals are read out from all of the pixels to achieve still image acquisition.

7. A digital camera comprising a solid-state imaging device according to claim 1.

8. The solid-state imaging device according to claim 1, wherein said three photoelectric conversion layers comprise a green photoelectric conversion layer for detecting a green color, a red photoelectric conversion layer for detecting a red color, and a blue photoelectric conversion layer for detecting a blue color.

9. The solid-state imaging device according to claim 8, wherein said three signal charge accumulators comprise a green signal charge accumulator which is electrically connected to said green photoelectric conversion layer by a wiring, a red signal charge accumulator which is electrically connected to said red photoelectric conversion layer by a wiring, and a blue signal charge accumulator which is electrically connected to said blue photoelectric conversion layer by a wiring.

10. The solid-state imaging device according to claim 1, wherein said three photoelectric conversion layers comprise an organic material.

11. The solid-state imaging device according to claim 1, wherein said signal readout portion comprises:
   a vertical transfer portion for reading out signal charges accumulated in the signal charge accumulators and transferring the signal charges in the column direction;
   a horizontal transfer portion for transferring the signal charges transferred from the vertical transfer portion in the row direction; and
   an output portion for outputting a signal outside corresponding to the signal charges transferred from the horizontal transfer portion.

12. A digital camera comprising:
   a solid-state imaging device comprising:
      a semiconductor substrate;
      plural photoelectric conversion layers stacked above the semiconductor substrate, each detecting a different color from the others of the plural photoelectric conversion layers; and
      plural signal charge accumulators formed in the semiconductor substrate and electrically connected to said plural photoelectric conversion layers, said plural signal charge accumulators accumulating signal charges generated in a corresponding layer of the plural photoelectric conversion layers,
   wherein the plural photoelectric conversion layers and plural signal charge accumulators are included in plural pixels arranged in a square lattice pattern on a surface of the semiconductor substrate, the square lattice pattern extending in a column direction and a row direction perpendicular to the column direction, the column and row direction being parallel to the surface of the semiconductor substrate, and each of the plural pixels comprising the plural signal charge accumulators which are arranged in the column direction on the surface of the semiconductor substrate,
   wherein an arrangement of the pixels is such that the square lattice pattern of the plural pixels includes a first pixel row comprising a first array comprising said plural signal charge accumulators in a first sub-row of each pixel in the first pixel row, a second array comprising said plural signal charge accumulators arranged in a second sub-row of each pixel in the first pixel row, and a third array comprising plural signal charge accumulators in a third sub-row of each pixel in the first pixel row,
   wherein the plural signal charge accumulators are arranged such that each of the first, second and third arrays includes all of the three signal charge accumulators, and
   wherein the plural signal charge accumulators are provided apart from the plural photoelectric conversion layers and are electrically connected to the plural photoelectric conversion layers via respective wirings, and the signal charges accumulating in the plural signal charge accumulators are transferred through the respective wirings from the plural photoelectric conversion layers.

13. The digital camera of claim 12, wherein said camera comprises a thinning-out readout mode in which signals are read out only from the pixels in odd rows of said solid-state imaging device, and a normal readout mode in which signals are readout from the pixels in both odd and even rows of said solid-state imaging device.

14. The digital camera of claim 13, wherein said plural signal charge accumulators comprise three signal charge accumulators including a red signal charge accumulator, a green signal charge accumulator and a blue signal charge accumulator, such that a row from which a signal is read out in said thinning-out readout mode includes said three signal charge accumulators.

15. The solid-state imaging device according to claim 1, wherein the arrangement of the pixels comprises a plan view arrangement of the pixels.

16. The solid-state imaging device according to claim 1, wherein the pixels in the first pixel row are arranged in one of a row direction and a column direction.

17. The solid-state imaging device according to claim 9, wherein the pixels comprise:
   a first pixel comprising red, green and blue signal charge accumulators arranged in a column direction in that order;
   a second pixel comprising green, red and blue signal charge accumulators arranged in a column direction in that order.

18. The solid-state imaging device according to claim 17, wherein the arrangement of the pixels comprises one of:
   a row including the first, fourth, fifth and fourth pixels arranged repeatedly in that order in a row direction such that the three signal charge accumulators are arranged in a longitudinal stripe layout;
   a column including the sixth, second, third and second pixels arranged repeatedly in that order in a column direction such that the three signal charge accumulators are arranged in a lateral stripe layout; and
   a row including the first and fourth pixels arranged alternately in a row direction and a row including the fourth and fifth pixels arranged alternately in a row direction such that the three signal charge accumulators are arranged in a Bayer layout.

19. The solid-state imaging device according to claim 9, wherein the pixels comprise:
   a pixel comprising blue, green and red signal charge accumulators arranged in a column direction in that order;
   a pixel comprising green, blue and red signal charge accumulators arranged in a column direction in that order; and
   a pixel comprising blue, red and green signal charge accumulators arranged in a column direction in that order.

20. The solid-state imaging device according to claim 9, wherein the pixels comprise:
   a pixel comprising red, blue and green signal charge accumulators arranged in a column direction in that order.

21. A solid-state imaging device comprising:
   a semiconductor substrate;
   a plurality of photoelectric conversion layers comprising three photoelectric conversion layers stacked above the semiconductor substrate, each detecting a different color from the others of the three photoelectric conversion layers,
   a plurality of signal charge accumulators comprising three signal charge accumulators in the semiconductor substrate, each accumulating signal charges generated in a corresponding layer of the three photoelectric conversion layers; and a signal readout circuit in the semiconductor substrate, the signal readout circuit reading out signals corresponding to the signal charges accumulated in the three signal charge accumulators, wherein a plurality of pixels is arranged in a square lattice pattern on a surface of the semiconductor substrate, the square lattice pattern extending in a column direction and a row direction perpendicular to the column direction, the column and row direction being parallel to the surface of the semiconductor substrate, and each of the pixels comprising the three signal charge accumulators which are arranged in the column direction on the surface of the semiconductor substrate, wherein an arrangement of the pixels is such that the square lattice pattern of the pixels includes a first pixel row comprising:
  a first array comprising signal charge accumulators in a first sub-row of each pixel in the first pixel row;
  a second array comprising signal charge accumulators arranged in a second sub-row of each pixel in the first pixel row; and
  a third array comprising signal charge accumulators in a third sub-row of each pixel in first pixel row, wherein the three signal charge accumulators are provided apart from the three photoelectric conversion layers and are electrically connected to the three photoelectric conversion layers via respective wirings, and the signal charges accumulating in the three signal charge accumulators are transferred through the respective wirings from the three photoelectric conversion layers, and wherein the first array, second array and third array comprise a lateral stripe layout.

* * * * *